US005097259A

United States Patent [19]

Testa et al.

[11] Patent Number: 5,097,259

[45] Date of Patent: Mar. 17, 1992

[54] LINE FAULT ISOLATION SYSTEM

[75] Inventors: Bruce V. Testa, Cromwell; Brian M. Morris, Wallingford, both of Conn.

[73] Assignee: General Signal Corporation, Stamford, Conn.

[21] Appl. No.: 539,405

[22] Filed: Jun. 18, 1990

[51] Int. Cl.[5] .......... H04B 3/00

[52] U.S. Cl. .......... 340/825.36; 361/62; 361/63; 340/506

[58] Field of Search .......... 340/825.17, 825.36, 340/506, 517, 537, 577, 518, 650, 825.01, 825.05; 307/116; 370/16.1; 361/62, 63

[56] References Cited

U.S. PATENT DOCUMENTS

| | | | |
|---|---|---|---|
| 4,369,435 | 1/1983 | Adachi et al. | 340/577 |
| 4,507,652 | 3/1985 | Vogt et al. | 340/825.36 |
| 4,568,919 | 2/1986 | Muggli et al. | 340/518 |
| 4,752,698 | 6/1988 | Furuyama et al. | 340/506 |
| 4,796,012 | 1/1989 | Schechter et al. | 340/506 |
| 4,864,519 | 9/1989 | Appleby et al. | 340/825.36 |

FOREIGN PATENT DOCUMENTS

| | | | |
|---|---|---|---|
| 3637681 | 3/1988 | Fed. Rep. of Germany | 340/650 |

*Primary Examiner*—Donald J. Yusko
*Assistant Examiner*—Dervis Magistre
*Attorney, Agent, or Firm*—Robert R. Hubbard; John F. Oblandt

[57] ABSTRACT

An alarm system in which a pair of transmission lines are disposed in a loop to define two channels of transmission from a controller to a group of interconnected detectors, the improvement comprising a spaced group of line fault isolators interleaved with respective subgroups of detectors and connected across the lines for sensing a short circuit on the transmission lines so as to isolate the short circuit condition; the isolators including an arrangement for switching, in response to a signal transmitted from the controller, those isolators which are physically located adjacent to the short circuit without interfering with the operation of other detectors in the loop.

6 Claims, 7 Drawing Sheets

FIG. 4A
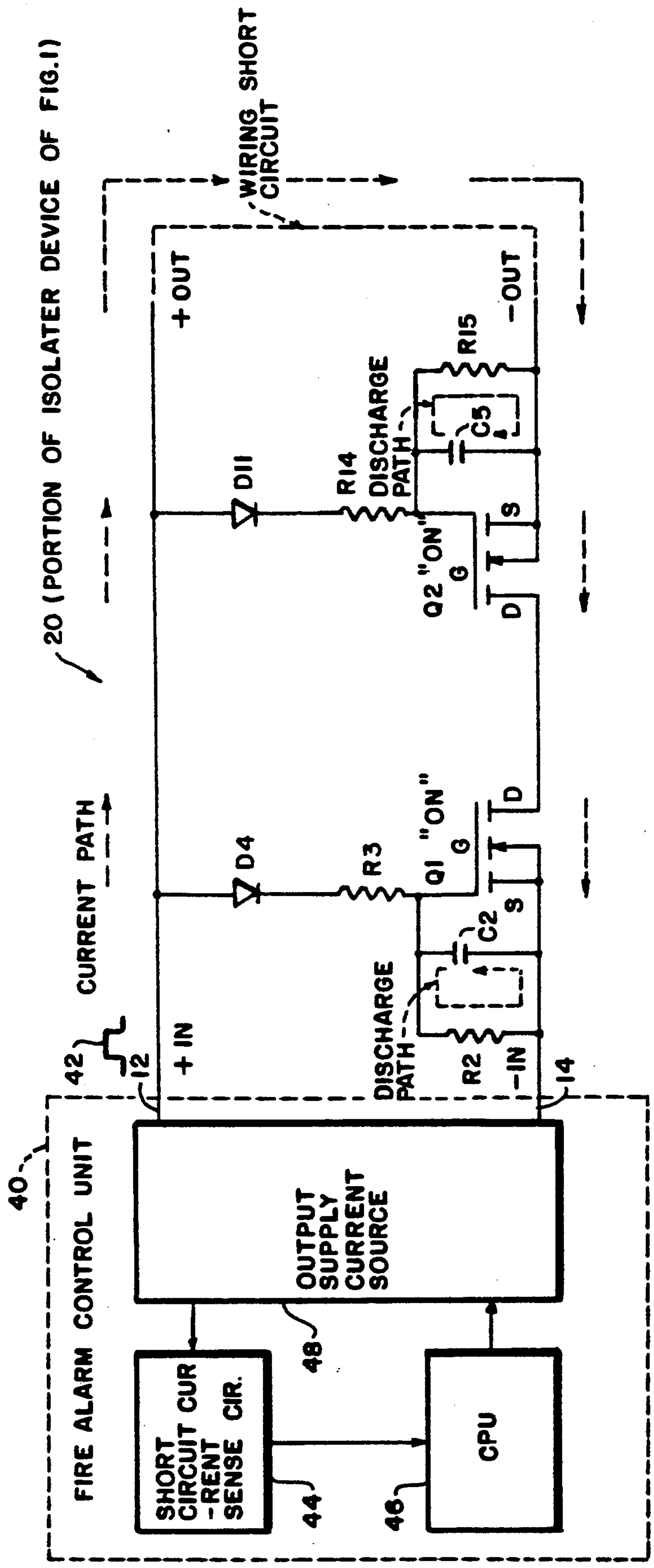
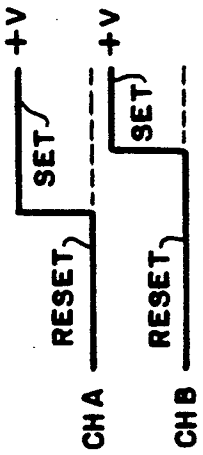
FIG. 4B

WALK BACK SIGNAL →

LINE FAULT ISOLATION SYSTEM

BACKGROUND OF THE INVENTION

The present invention relates to an improvement in electrical arrangements for isolating short circuit faults and undervoltage conditions from the other part of an alarm system, such as a fire alarm system or the like.

The central controller (sometimes referred to as a control unit, also as a central panel) of a fire detection system may be required to be connected to a large number of sensors or detectors located throughout a given premises.

In general, it is know to design and manufacture fire alarm systems and devices in which, characteristically, control units or panels are provided to divide the protected premises into areas or fire zones. Each zone is monitored separately by the controller or panel for troubles and alarm conditions. This zonal arrangement allows for some precision in identifying the location of a fire alarm or a trouble condition. However, conventional systems suffer the disadvantages of the high cost of wiring involved in multiple monitoring circuits, where a more precise means for locating a fire is desired.

Because of recent demand due to stricter fire codes, as well as to rising insurance premiums and pressures from local fire departments, coupled with significant cost reductions in high technology electronic circuits, it has become more economically feasible for manufacturers of fire alarm systems and devices to develop equipment which incorporates circuitry that establishes a sophisticated communication link between the control unit or panel and the sensors or devices that are interconnected in, or connected across, appropriate transmission lines or loops.

Generally speaking, upon proper configuaration of such a sophisticated system, the control panel or unit has the ability to determine the status of any detector device as well as to pinpoint the device's exact location. These types of systems have come to be commonly referred to as "addressable fire alarm control panels". Moreover, such systems lend themselves to the elimination of complex and/or extensive wiring schemes and monitoring circiuts.

However, up until recently there has been a lack of assurance of maximum protection in the event of a hazardous condition, such as an open connection or break in the wiring; or, on the other hand, a short circuit fault in the wiring. What has been proposed heretofore, particularly in the latter case of a short circuit fault is an arrangement for detecting and isolating any such short circuit fault, but one which unfortunately could render all of the detector devices inoperative.

Reference to U.S. Pat. No. 4,528,610 makes clear the kind of circuitry that has been contemplated for isolating a section of a loop circuit from a bidirectional supply unit, in the event of a short circuit in the section; however, such an arrangement, as described, does not provide sufficient control from the control unit over the short circuit condition to insure that the possibility is eliminated of having all or substantially all of the detector devices rendered inoperative upon occurrence of the short circuit.

Accordingly, it is a primary object of present invention to provide a means which will allow a large portion of the interconnected detectors to remain operational in the event of a short circuit on a bidirectional loop ("Class A"). More specifically, it is an object of the present invention to provide selectivity in the arrangement such that only the detectors which are physically located adjacent to the shorted section of wire will be caused to switch from a low impedance path to a high impedance path.

Another object of the present invention is to provide such low impedance path during normal system operation, thus providing that the interconnected detectors' operating currents produce small line losses.

A further object of the present invention is to provide the same benefit of a low impedance path for interconnected devices that are arranged in a unidirectional configuration.

Yet another object is to provide a means to automatically disconnect detectors which are operating at line voltages that are below minimum requirements. By doing so maximum reliability is obtained.

SUMMARY OF THE INVENTION

The present invention provides system control over short circuit isolations; that is to say a controlling factor is the control unit or panel at a central location which furnishes the system a means to filter out occurrences of line transients and intermittent short circuits which would otherwise cause false isolations, as is encountered with present well known similar designs.

Moreover, the present invention enables selectivity in the response to short circuits and like conditions. Thus it is a primary feature of the present invention to have the control unit or panel sense a given short circuit condition and then to generate a unigue signal (referred to as a "walkback" signal) which selectively switches those isolator devices which are physically located adjacent to a short circuit, but without interfering with the operations of other interconnected detectors.

Another feature which forms part of the present invention is an undervoltage detection arrangement. Thus the invention provides line voltage detection and automatic load control, whereby an appropriate isolator device will automatically change from a low impedance path to a high impedance path when the wiring voltage connected to this isolator device drops below the minimum operating voltage of the given interconnected detectors. Clearly this circumstance can easily be appreciated where wiring impedances and unaccountable elevated wiring currents (i.e. faulty interconnected detectors) are present.

Yet another feature or aspect of the invention involves a means to control and limit the total inrush current seen by the control unit when power is first applied to the interconnected detectors. This feature allows for the use of low cost, low power devices, such as field effect transistors, thereby to configure the control unit's supply output circuitry, as well as provide interconnected detector versatility, in the sense that one can intermix devices with different inrush current specification. Other and further objects, advantages and features of the present invention will be understood by reference to the following specification in conjunction with the annexed drawing, wherein like parts have been given like numbers.

BRIEF DESCRIPTION OF DRAWING

FIG. 4A is a schematic diagram depicting an inventive isolator device in simplified form, and including a schematic showing of the arrangement within the control unit or panel for sensing a reflected large current pulse under short circuit conditions and for responding, by generating an output signal for transmission to the isolator devices so as to accomplish the distinctive result in accordance with the present invention.

FIG. 4B consists of pulse diagrams useful in explaining ciruit operation.

DESCRIPTION OF PREFERRED EMBODIMENT

Inrush Current Limit

Figure 1:
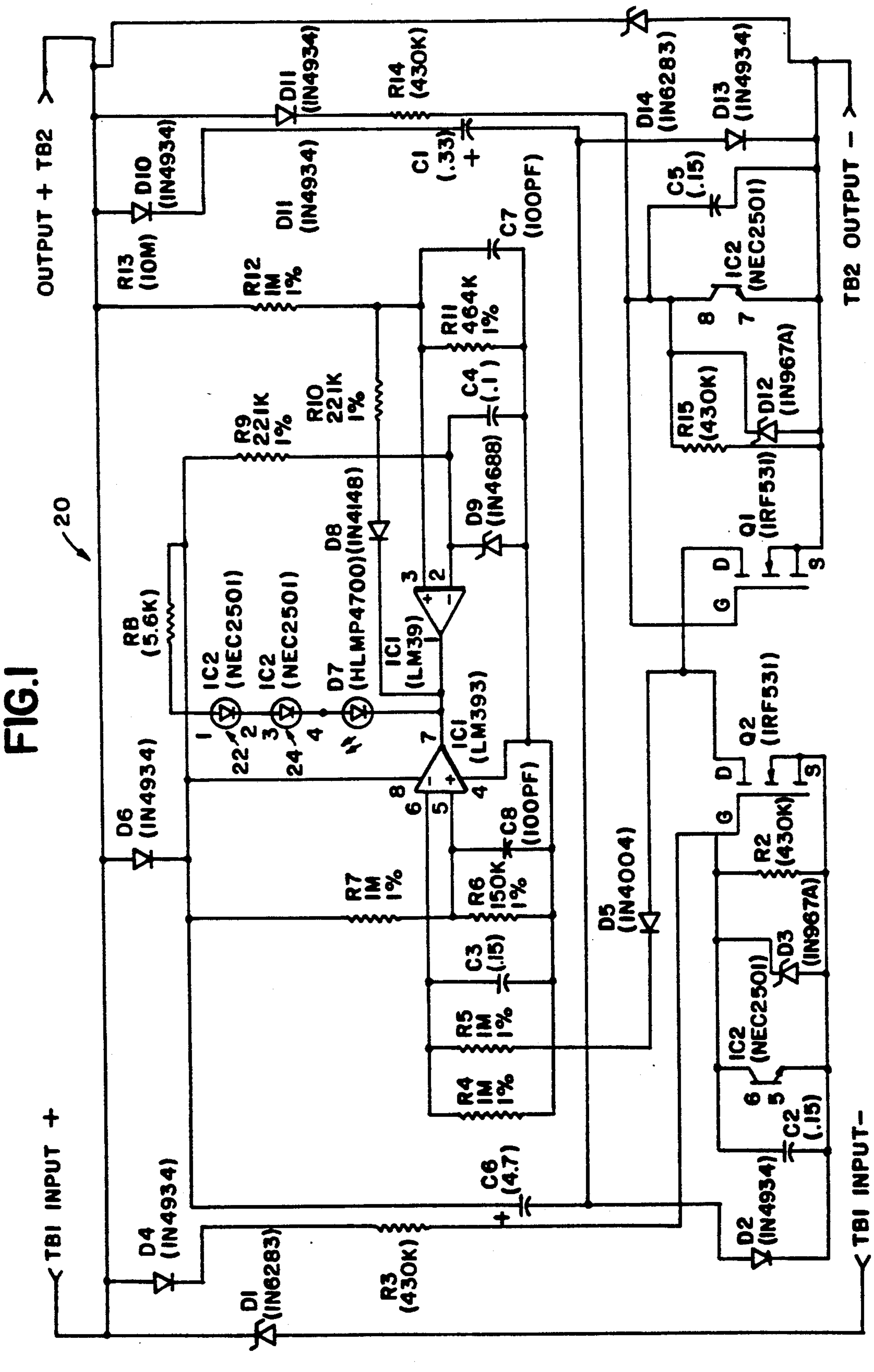
FIG. 1 is a schematic diagram of an isolator device forming part of the present invention.

Referring now to FIG. 1 of the drawing, there will first be discussed the feature by which an inrush current limit is imposed on the system. First of all, it is assumed that power is applied to isolator device 20 by way of the input terminals TB1 seen at the left in FIG. 1. At this time the capacitors C6 and C1 are rapidly charged to the peak amplitude of the applied voltage through the diodes D2, D6 and D2, D10 respectively (D2 being at the lower left in FIG. 1 and the diodes D6 and D10 being in the upper portion thereof). It should be noted that in this figure the value or type of device is indicated in parentheses below the designation for a given element, such as capacitor, resistor or diode and the like. For a capacitor, the value is in microfarads unless otherwise noted.

It will be understood that resistors R7 and R6 form a voltage divider such that a fraction of the applied peak voltage across these resistors is applied to pin 5 of the operational amplifier IC1, while the voltage divider formed by R12 and R11 in symmetrical fashion determines the voltage applied to pin 3 of the same operational amplifier IC1.

It will be appreciated that IC1's plus input pins (i.e. 3 and 5) voltage levels exceed the voltage levels of minus input pins (2 and 6). Accordingly, IC1's output pins 1 and 7, respectively, are disabled, thereby rendering the optically coupled integrated circuit devices, IC2, appearing on the left and right respectively, at the lower portion of the figure, nonconductive. The integral LED's 22 and 24 is connected at the common output (pins 1 and 7) of IC1 provide the light to be coupled to IC2. Therefore Q1 and Q2 are normally OFF (nonconductive), thereby blocking current flow to the output terminals TB2. The output voltage of the isolator device 20 is equal to zero at this time.

Subsequent to the above described operation, capacitor C2 (lower left in FIG. 1) begins to charge through resistor R3 and diode D4, and, at approximately 2–4 volts, field effect transistor Q1 (having gate, source and drain as indicated) turns ON (with 5ms -12ms delay). A current path is established through transistor Q1 and the internal diode 10 of transistor Q2 (such diode not seen in FIG. 1, but appearing in FIGS. 2A and 2B [opposite direction of transmission]), Consequently, the value of Vout is now equal to V+ (the input voltage minus a diode drop of approximately 0.7 volts.)

Due to the above considerations, another current path is established through capacitor C5 (lower right in FIG. 1) resistor R14 and diode D11. As a result, capacitor C5 begins to charge at approximately 2–4 volts and Q2 turns ON. With transistor Q2 being in a conductive state, the internal diode drop thereof is eliminated, thereby minimizing the series loss to (Itotal)×(Q1RDSon+Q2RDSon), where Itotal equals the total interconnecting detector current and RDSon equals resistance from drain to source in the "ON" state.

Figure 2A:
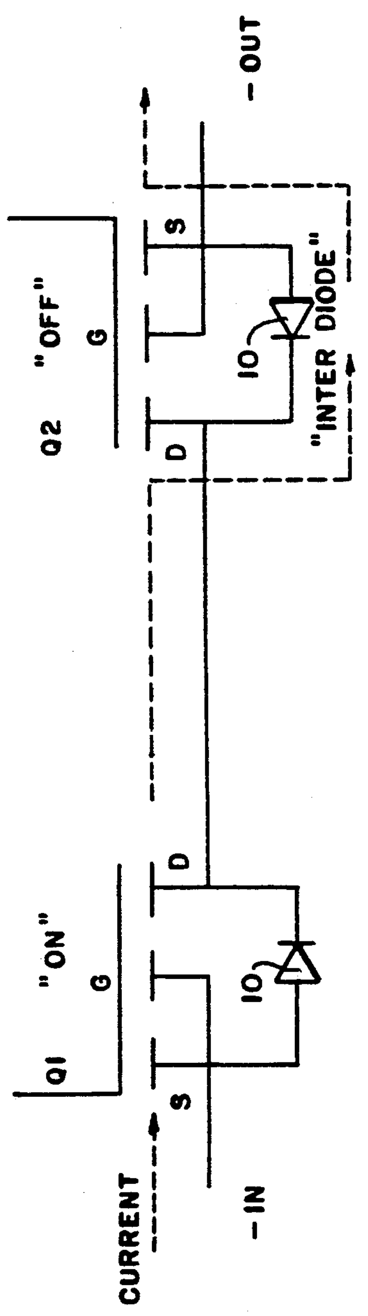
FIGS. 2A and 2B are simplified depictions of the two different directions of transmission within the isolator device of FIG. 1.
Figure 2B:
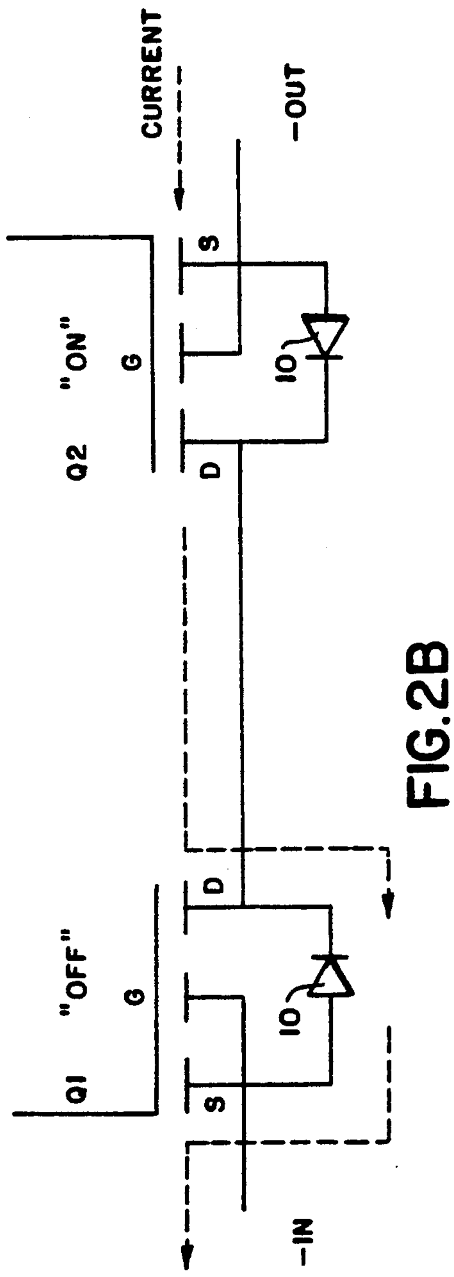
Figure 3A:
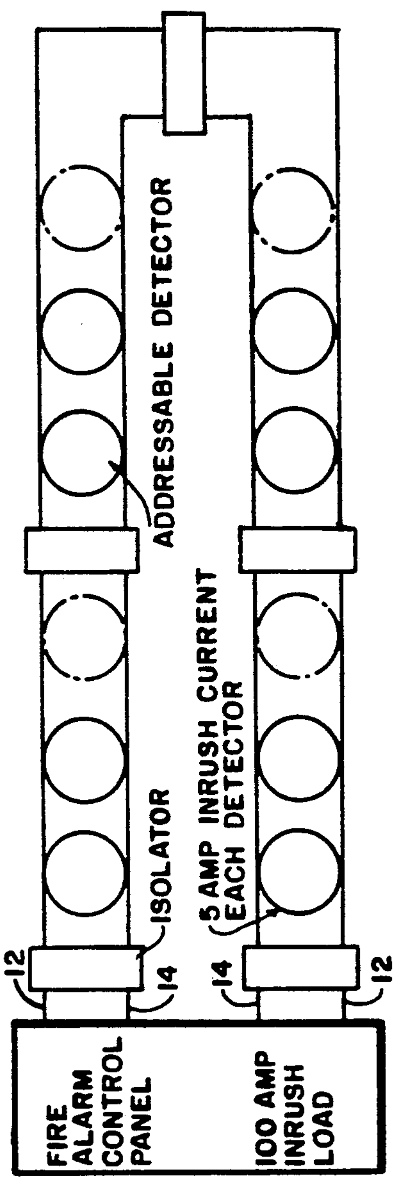
FIG. 3A is a block diagram of a typical conventional addressable alarm system showing groups of addressable detectors separated by a plurality of isolator devices.
Figure 3B:
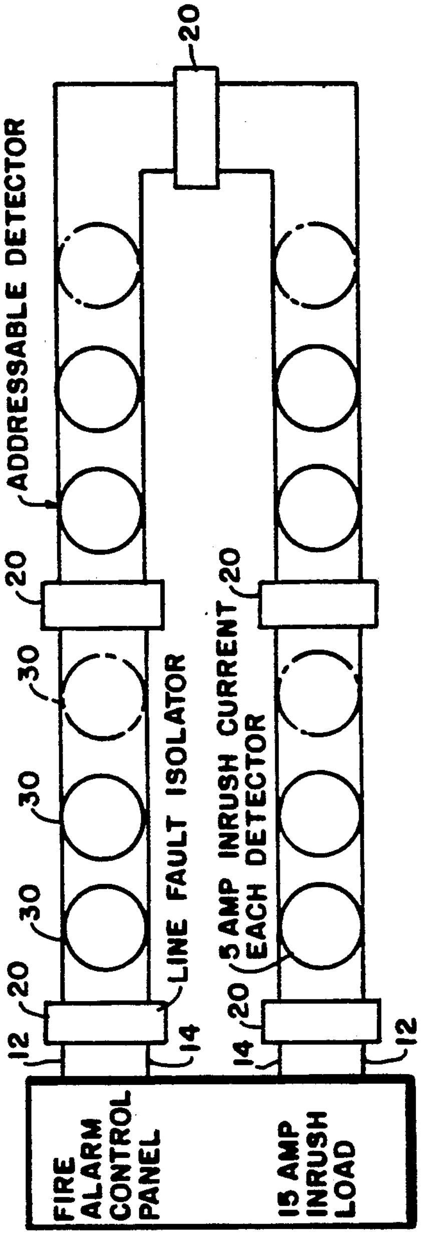
FIG. 3B is a block diagram of the system in accordance with the present invention, from an overall point of view, including depiction of the groups of addressable detectors, and specialized line fault isolators, each of which involves a 5 millisecond delay arrangement.

As will be appreciated, this effect greatly increases the ability to connect a large number of detectors to the transmission lines 12 and 14, as seen in the loop configurations of FIGS. 3A and 3B. The further result of this is the maximization of the number of operational interconnected detectors that can remain operational when a short circuit occurs. A noteworthy aspect of the primary feature of the present invention, as seen in FIGS. 2A and 2B, is the use of Q1 and Q2's internal diodes 10 to establish current paths which would otherwise require external components and thereby involve higher costs.

An implementation of the unique isolator device's ability to provide inrush current limiting, will be appreciated by reference to FIGS. 3A–3B, wherein the conventional system is seen in FIG. 3A and the system of the present invention in FIG. 3B. In FIG. 3B, the isolator devices are interleaved with detectors connected in groups across the lines of the loop such that subgroups of, for example, 25 detectors are provided between pairs of isolators.

In FIG. 3A, the panel must provide inrush current which is equal to the inrush current of one detector times the total number of detectors connected to the loop (i.e. 5 amps ×12 detectors =70 amps). In FIG. 3B, the panel must provide inrush current which is only equal to the inrush current of one detector times the number of detectors between isolators (i.e. 5 amps ×3 detectors =15 amps).

System Line Analysis (Short Circuit Condition)

Referring now to FIG. 1. of the drawing, there will be seen on the far left two input terminals TB1 and on the far right two output terminals TB2 (the upper terminals also being designated input plus and output plus respectively and the lower terminals input minus and output minus).

Let it be assumed that a short circuit condition arises across the output terminals TB2 and this causes the input voltage to drop to zero volts. During this time interval when the input voltage is dropping, transistors Q1 and Q2 (seen at the bottom of FIG. 1) remain in condition by virtue of a relatively long time constant provided by capacitor C2 (bottom left) in conjunction with resistor R2. This constitutes a low impedance, normal condition for the isolator devices.

It is a noteworthy feature of the present invention that the short circuit condition now becomes an integral part of this isolator output and, in conjunction with the control unit's output supply provides a means for this isolator device to reflect a large current pulse back to the control unit. This feature will be understood by further reference to FIG. 4 of the drawing in which there will be seen a fire alarm control unit or panel 40 basically similar to the panel seen previously in FIG. 3B. Connected to this control unit 40, in simplified form, is a first isolator device 20.

When the assumed short circuit occurs, as indicated by the dotted lines at the output of the isolator device 20 in FIG. 4, a large current pulse 42 will be reflected back to the current unit 40 and will be suitably fed to the short circuit current sense circuit 44 forming part of the control unit. A further signal is sent to the CPU 46 responsive to which a command signal is sent from the CPU 46 to the output supply current source 48. As a consequence of this command signal, a reset (deactivate) signal is produced on lines 12 and 14 forming a typical loop. This reset signal is transmitted to all isolators connected to the lines 12 and 14. Reset is accomplished when capacitors C2 and C5, seen connected to transistors Q1 and Q2 respectively in FIG. 4A, have been completely discharged.

It will be understood that when the reset signal, which can be applied sequentially to both channel A and channel B in typical fashion as seen in FIG. 4B, is timed out in accordance with program control, the control unit 40 transmits a set (activate) signal, also seen in FIG. 4B, which is received first by the isolator device 20 that is physically located closest to the control panel 40.

The isolator device 20, which is assumed to be the first isolator encountered, is now activated whereby a short circuit at the output during the time transistor Q1 is in the "OFF" state allows capacitor C3 (FIG. 1) to charge through resistor R5, diode D5, and through transistor Q2's internal diode and through the short circuit. If the short circuit is present when the voltage on capacitor C3 (IC1 pin 6) exceeds the voltage on IC1 pin 5, then IC1 pin 7 goes "LOW", allowing current to flow through LED D7 and IC2 thereby causing IC2 to conduct, and hence keeping transistors Q1 and Q2 "OFF".

It will be understood that if a transient and/or an intermittent short, typically of quite short duration, caused the above sequence to occur, then capacitor C3 would have a voltage that would not exceed the voltage on IC pin 5; consequently, no isolation would take place.

A significant effect of no isolation taking place is that the activate signal will be transferred to the next device (this is sometimes referred to as "walkback"). This is also a notable feature of the present invention; that is, the "walking" effect of the activate signal from one isolator device to the next. This effectively eliminates false isolations due to transients and/or intermittent short circuits. See FIGS. 5A-5E for an understanding of the sequence of events attendant upon the occurrence of an applied transient. FIGS. 5A-5E depict a configuration whereby a transient of a duration which is less than the duration to activate three line fault isolators is filtered out.

Figure 5A:
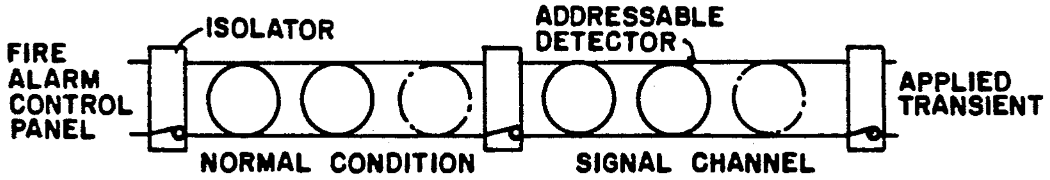
FIGS. 5A through 5E are block diagrams illustrating the changing conditions in the system of the present invention, as a consequence of a transient occurring somewhere along the line; the invention operating to avoid shutdown due to a transient being present.
Figure 5B:
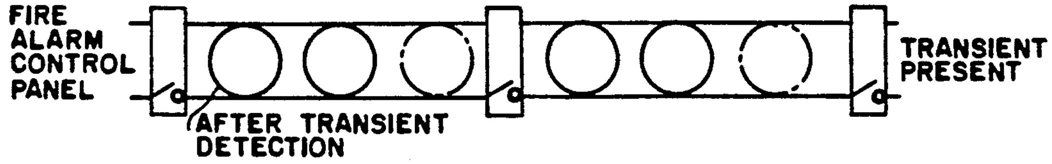
Figure 5C:
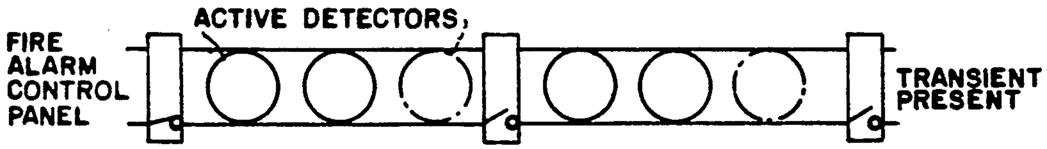
Figure 5D:
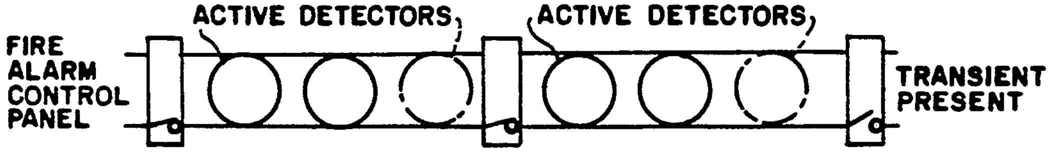
Figure 5E:
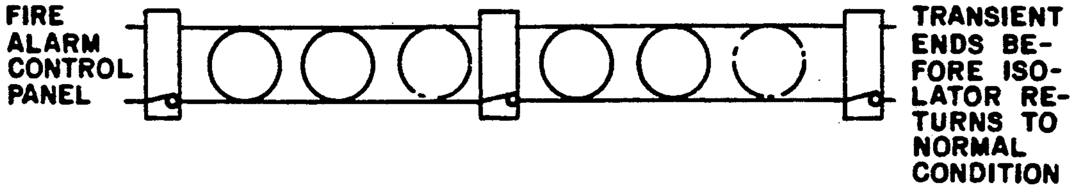

FIG. 5A depicts the isolators in a normally "ON" (low impedance) condition. At this time, a transient is applied to the output terminals of the last isolator.

FIGS. 5B-5E depict the control panel receiving a large current pulse as a result of the applied transient, thus initiating the "walkback" sequence.

The walkback feature also eliminates detector corruptions, as opposed to similar constructions, whereby there is an immediate reaction which can cause the possibility of false isolations and detector corruptions. Another aspect of this feature allows a short circuit to be detected only by the device which is physically located adjacent to the short circuit. This eliminates the possibility of the short circuit being detected and isolated by any other isolator device(s) connected to the wiring. This assures that the largest portion of detectors remain operational during a wiring short circuit. In accordance with similar constructions known in the art, a low impedance path is provided in normal operation. This can cause short circuits to be detected by isolators that are not adjacent the short circuit due to circuit reaction time which is dependent on transistors thresholds which are variable.

Figure 6:
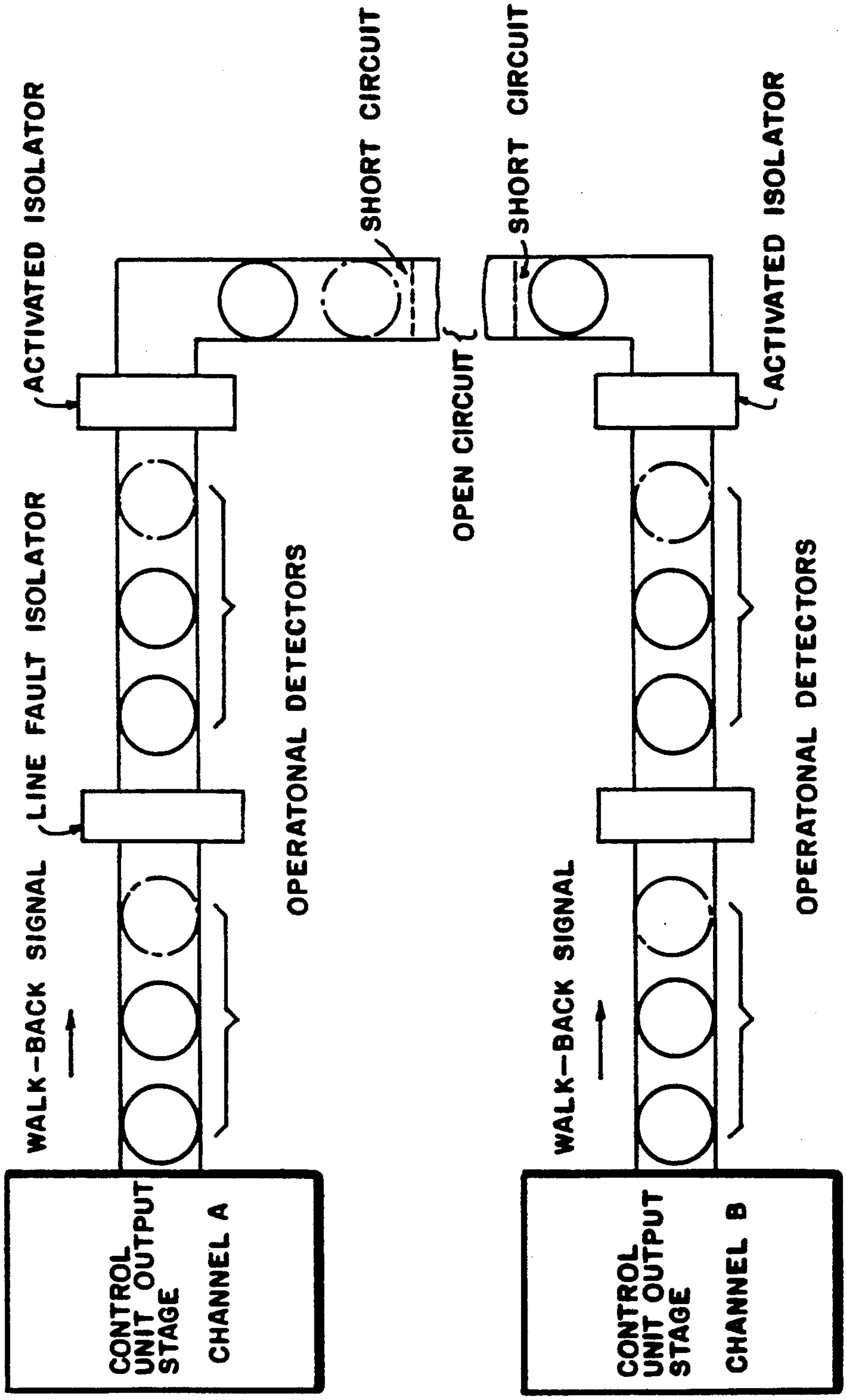
FIG. 6 is a block diagram of a transmission line or loop (Class A) containing the invention by which a short citcuit condition causes isolation precisely where desired; that is, by only that pair of isolators immediately adjacent the short circuit condition.

Another noteworthy aspect of the "walkback" signal is its implementation in a dual channel loop (Class A) configuration. This is previously alluded to in connection with the depiction of the set and reset signals of FIG. 4B. This is further shown in FIG. 6 in which configuration the walkback signal is first transmitted on channel A allowing a single isolator device to operate and isolate the short circuit from channel A's output. Once the signal times out on channel A, it is immediately transmitted on channel B which allows the second isolator device to operate and isolate the short circuit from channel B's output. This alternate or bidirectional transmission protocol allows short circuit protection during an open wiring condition on a loop (Class A) wiring configuration.

Line Voltage Detector

Referring back to FIG. 1 of the drawing, the line voltage monitor feature of the present invention comprises a peak detector/low pass filter comprising capacitor C1 and diode 10, a voltage detector (IC1, R9, D9, C4, R11 and R12) and a latch (D8 and R10). The voltage applied to IC pin 3 is a ratio portion of the total wiring voltage. The reference voltage applied to IC pin 2 selects the minimum threshold which determines the voltage level which will switch the isolator device from its low impedance path to its high impedance path. This is accomplished when the wiring voltage decreases below the detectors safe operating level. When this happens, the voltage on pin 3 of IC1 will drop below the reference voltage on pin 2. IC1 pin 1 will go low turning IC2 "ON" and transistors Q1 and Q2 "OFF". During this time the current path is established through D8 and resistor R10. This effectively decreases the voltage supplied to pin 3 well below the reference voltage on pin 2 and remains there when the short is disconnected and the wiring voltage returns to a normal level. The circuit remains in this state until it is reset by the control unit as alreadly described.

Figure 7:
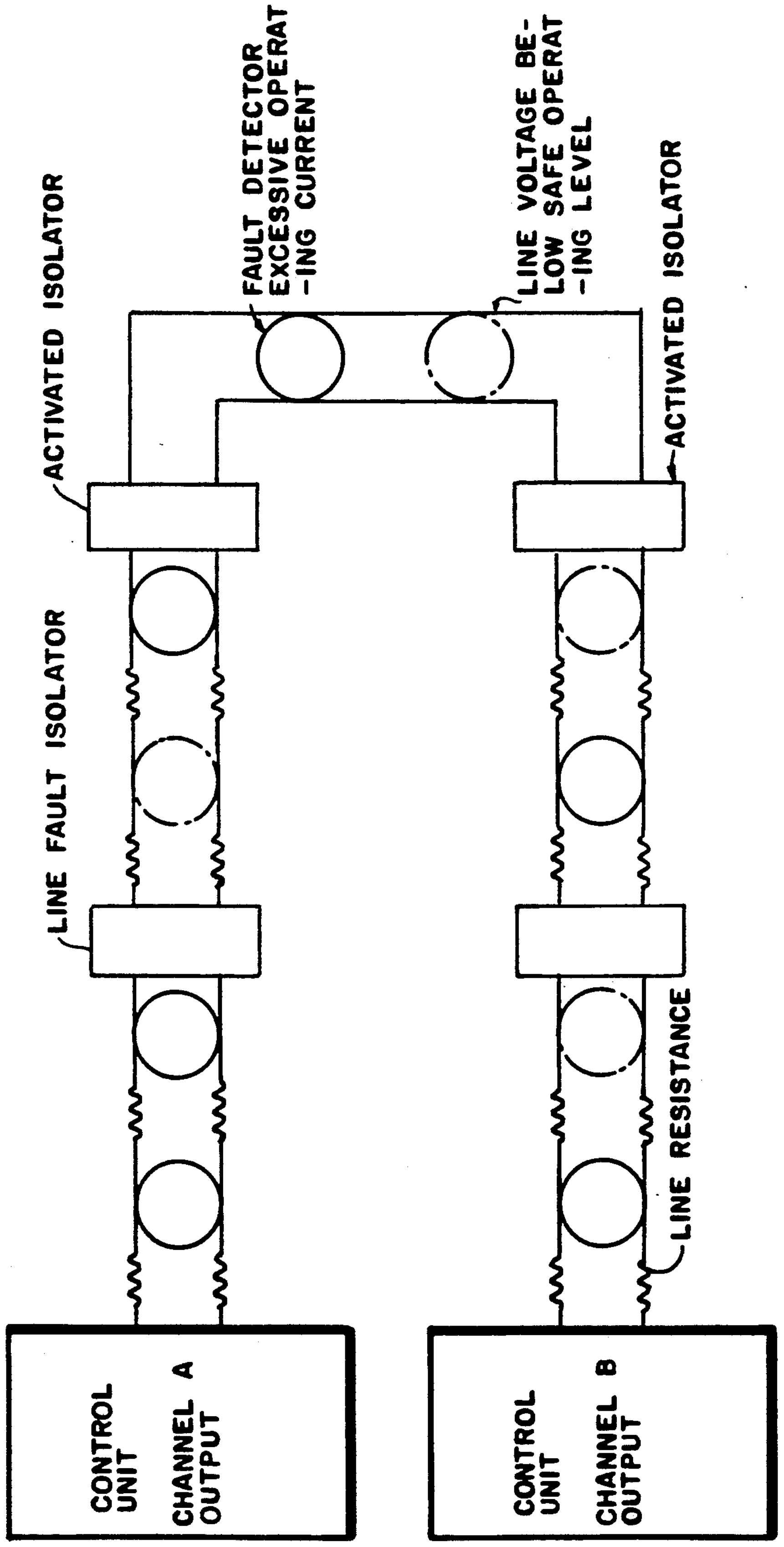
FIG. 7 is another block diagram depicting the system in accordance with the present invention by which a limited number of isolator devices are activated responsive to a faulty detector (that is, a detector having an excessive operating current), or responsive to a line voltage which is below a safe operational level.

A significant aspect resides in applications where wiring impedances are relatively high. Thus a substantial increase in wiring current (i.e. a defective detector) can cause wiring voltage drops to develop. This effect could possibly cause the wiring voltage in a section of wire to decrease below the safe operating level of the detectors (see FIG. 7). In this instance, the isolators connected to that section of wire would switch from a high impedance to a low impedance. This effectively disconnects the detectors which can no longer be guaranteed reliable.

What has been disclosed is a variety of features in a line fault isolator context which provide the following advantages:

System control over short circuit wiring faults is provided, involving the use of walkback signals. The significant result is that false isolations are eliminated as well as data transmission corruptions. Moreover, it is assured that only those isolators adjacent to the short circuit are activated and that further allow short circuit protection during an open wiring fault condition. Beyond the above, the invention sets limits on high inrush currents during power up and it provides line voltage sensing such that safe and reliable detector operating levels are assured.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

We claim:

1. An alarm system in which a pair of transmission lines are disposed in a loop to define two channels of transmission from a controller to a group of interconnected detectors, the improvement comprising:

a spaced group of line fault isolators, having low and high impedance states, interleaved with respective sub-groups of detectors and connected across said lines for sensing a short circuit condition on said lines so as to isolate said condition by switching from the low impedance to the high impedance state;

means forming part of said controller for sensing a first, reflected signal reflected thereto from said short circuit condition;

means for transmitting a second, deactivate signal from said controller to all of said isolators, responsive to the sensing of said first signal reflected to said controller from said short circuit condition;

said isolators including means for switching, responsive to a third, activate signal from said controller, subsequent to said second signal having been transmitted from said controller, only those isolators which are physically located adjacent to said short circuit without interfering with the operation of other detectors in said loop.

2. A system as defined in claim 1, further comprising means, connected to said lines as part of said isolator, responsive to the detection of low level voltage to automatically change the internal path of said isolator device from a low impedance to a high impedance when the wiring voltage connected to the isolator device drops below the minimum operating voltage of said detectors.

3. A system as defined in claim 1, further including means connected to said lines to limit the total inrush current when power is first applied to the interconnected detectors.

4. A system as defined in claim 1, in which said means for switching includes a pair of field effect transistors, and an internal diode connected in shunt with the source and drain of said transistors.

5. A system as defined in claim 4, in which a resistor is connected between the gate and source, and a capacitor is connected between the gate and source of said respective field effect transistors.

6. A system as defined in claim 5, in which a diode and a resistor in series are connected from the positive bus bar of said line fault isolators to the gates of the respective field effect transistors.

* * * * *